May 14, 1957 J. D. ALTEMUS 2,792,189
CONVERTIBLE AIRCRAFT WITH RETRACTABLE LIFT ROTOR
Filed July 16, 1953 5 Sheets-Sheet 2
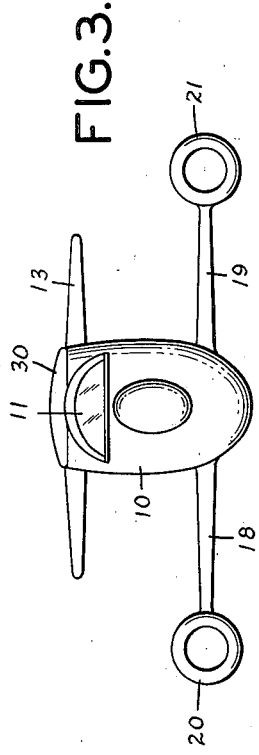
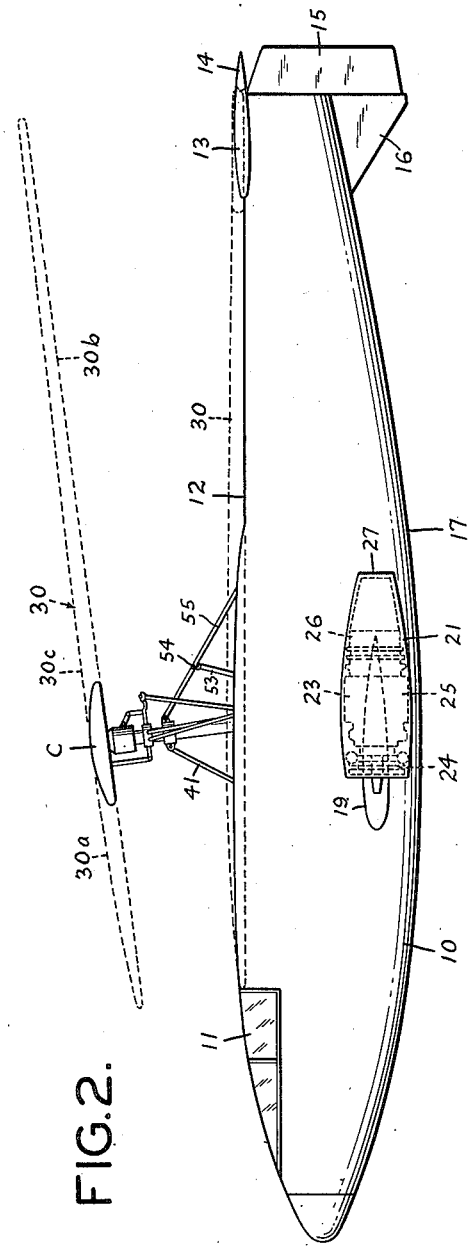
INVENTOR.
JAMES DOBSON ALTEMUS
BY
HIS ATTORNEYS.

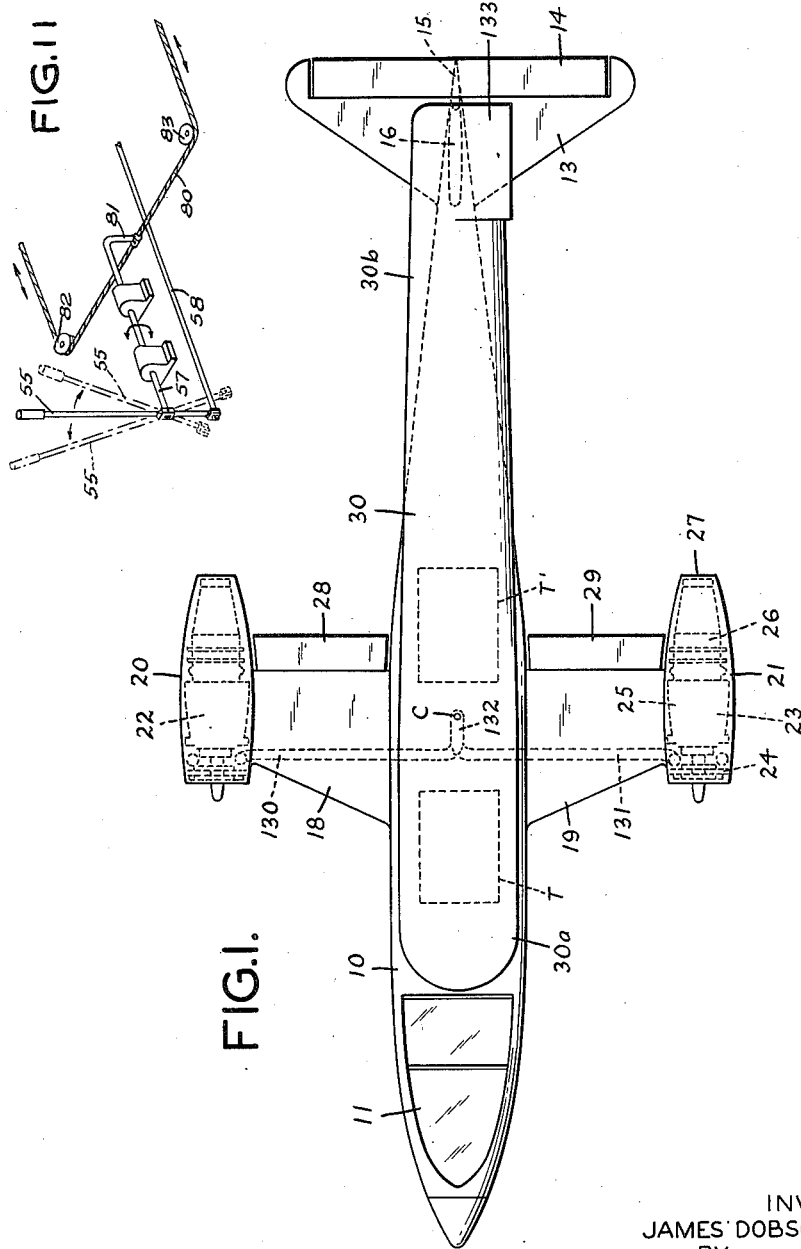
INVENTOR.
JAMES DOBSON ALTEMUS
HIS ATTORNEYS.

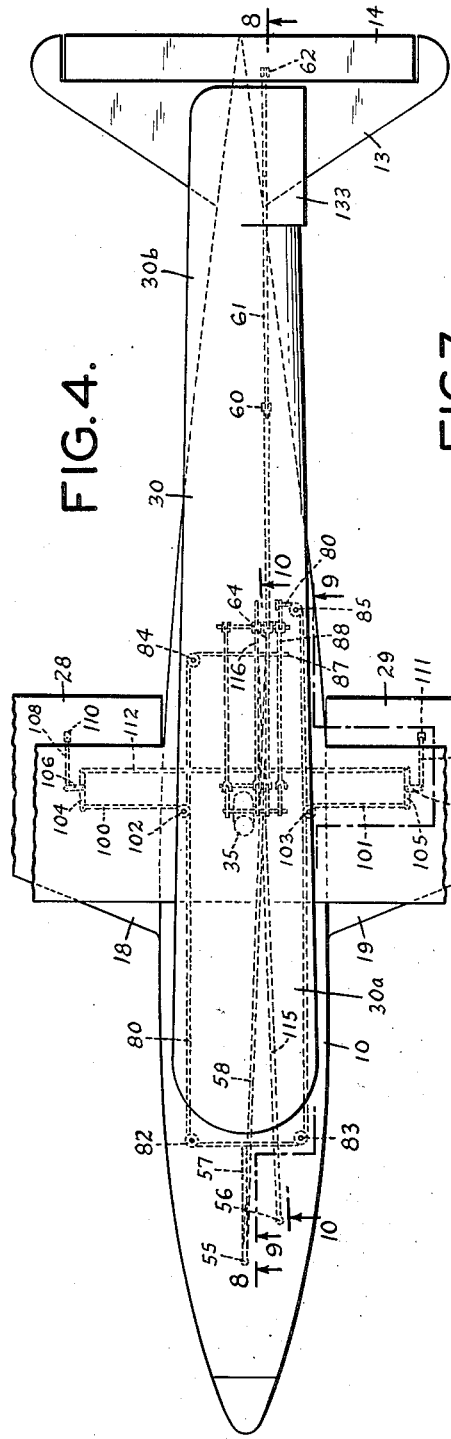
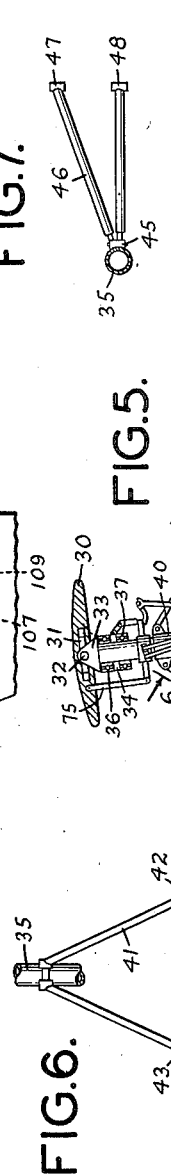
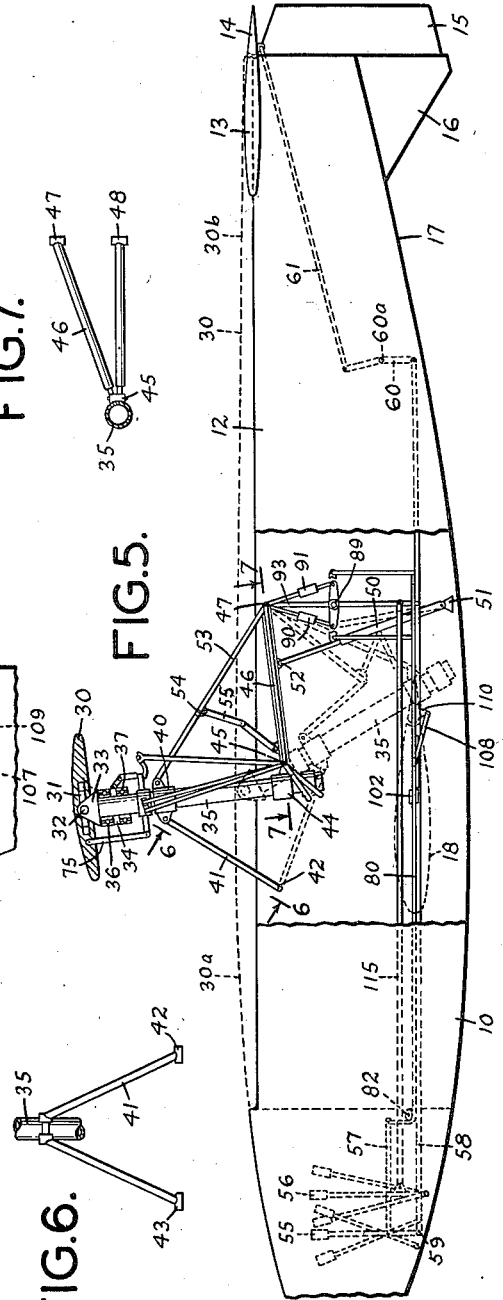

May 14, 1957  J. D. ALTEMUS  2,792,189
CONVERTIBLE AIRCRAFT WITH RETRACTABLE LIFT ROTOR
Filed July 16, 1953  5 Sheets-Sheet 4

INVENTOR.
JAMES DOBSON ALTEMUS
BY

HIS ATTORNEYS.

INVENTOR.
JAMES DOBSON ALTEMUS

HIS ATTORNEYS.

United States Patent Office

2,792,189
Patented May 14, 1957

2,792,189

CONVERTIBLE AIRCRAFT WITH RETRACTABLE LIFT ROTOR

James Dobson Altemus, New York, N. Y.

Application July 16, 1953, Serial No. 368,345

3 Claims. (Cl. 244—7)

This invention relates to improvements in convertible aircraft and it relates particularly to an improved aircraft which is convertible from a rotary wing aircraft having low speed landing and take-off characteristics to a fixed wing jet or rocket-propelled aircraft capable of high speeds suitable for high performance combat or transport use.

It has been proposed heretofore to provide fixed wing aircraft with rotary lifting wings of the helicopter or autogyro type in order to enable the aircraft to take off and to land almost vertically. The rotary wings on the aircraft are stopped once the aircraft has gained altitude and sufficient speed has been attained for the fixed wings to sustain the aircraft.

A rather serious defect of these prior types of devices is that the rotary wings, even when stopped, are located in the air stream and they impose a very heavy drag on the aircraft so that the performance characteristics of the aircraft are adversely affected. As a consequence, the performance characteristics of the aircraft has been an undesirable compromise between the relatively slow speed of the rotary wing type of craft and the relatively higher speed of the fixed wing craft.

The present invention relates to an improvement over the prior types of convertible aircraft in that it comprises a fixed wing aircraft which may be propelled by turbo-jet or rocket-type engines and having a rotary-type wing which is also rotated by means of a jet or rocket-type engine to enable the rotary wing to be used for take-off and landing. The rotary wing can also assist in supporting the craft in the air in the intermediate ranges of its speed and can auto-rotate to permit landing of the aircraft in the event of power failure. More particularly, the rotary wing of the new plane is mounted in such a manner that it can be retracted against the top of the fuselage of the plane and conforms thereto in such a manner that the wing itself, when stowed, imparts lift to the plane. In this way, the plane can be flown at high speeds by means of turbo-jet or rocket-propulsion while having also the low speed performance characteristics of a rotary wing aircraft to enable easy landing and taking off.

For a better understanding of the present invention, reference may be had to the accompanying drawing in which:

Fig. 1 is a plan view of a typical aircraft embodying the present invention;

Fig. 2 is a view in side elevation of the aircraft showing the rotary wing in end view and also side view in dotted lines;

Fig. 3 is a view in front elevation of the aircraft with the rotary wing retracted and stowed on top of the fuselage;

Fig. 4 is a fragmentary plan view of the aircraft showing the controls therefor in dotted lines;

Fig. 5 is a view in side elevation of the aircraft partly broken away to disclose details of the mechanism for erecting and lowering the rotary wing of the aircraft;

Fig. 6 is a view in section taken on line 6—6 of Fig. 5;

Fig. 7 is a view in section taken on line 7—7 of Fig. 5;

Fig. 11 is a perspective view of a portion of the control system for the aircraft.

Figure 8:
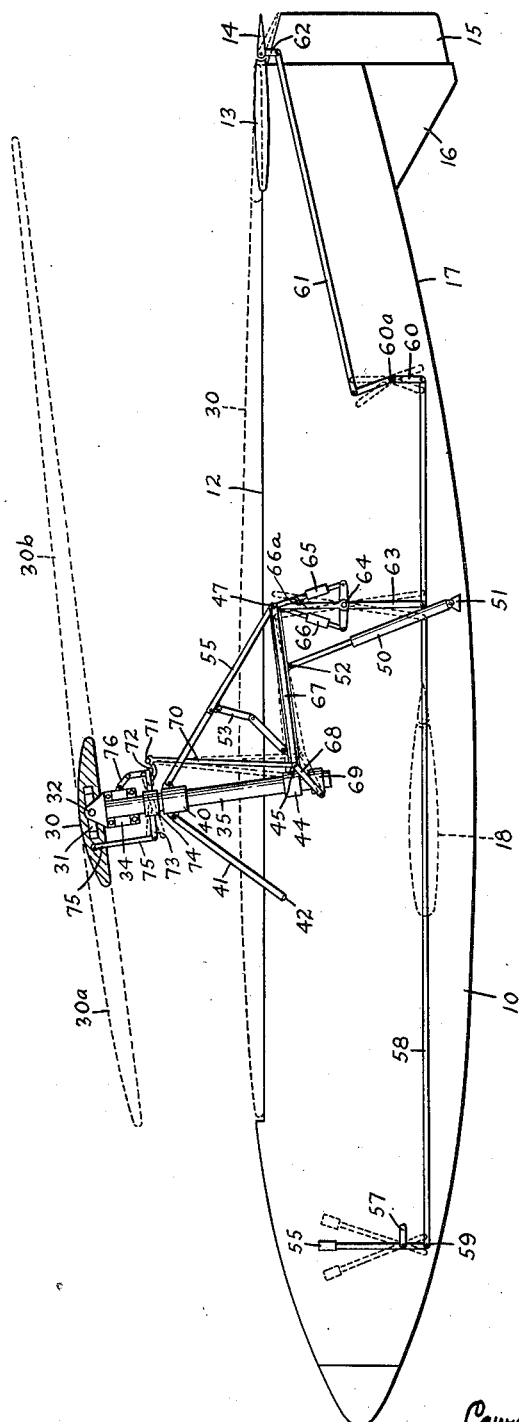
Fig. 8 is a view in side elevation showing the controls for the longitudinal control of the aircraft for both the fixed wing and rotary wing flight thereon.

The present invention will be described with reference to a single-place plane which is suitable for combat flying or the like and which may be propelled in fixed wing flight by means of a pair of turbo-jet engines. It will be understood, however, that the aircraft may be made sufficiently large to be used for transport purposes and that more or fewer engines may be provided for its propulsion, if desired. Moreover, rocket or ram jet engines may be substituted for the turbo-jet engines, if desired.

The new aircraft includes a fuselage 10 of suitably streamlined contour having a glass or plastic enclosed canopy 11 for the pilot's compartment. The top surface 12 of the fuselage is essentially straight from behind the canopy to its trailing end for a purpose to be described.

Approximately in alignment with the top surface 12 of the fuselage is the elevator fin 13 which has a movable elevator flap 14.

The rudder 15 is disposed below the elevator 13 and has its leading edge secured to the trailing end of the fuselage 10 and the fixed rudder fin 16 which extends downwardly from the lower curved surface or belly 17 of the aircraft. The arrangement of the rudder and elevator may be modified or repositioned as may be required with different engine locations.

Projecting laterally from the fuselage are the wings 18 and 19 which have swept-back leading edges and carry at their outer ends the pods 20 and 21 of the turbo-jet engines 22 and 23. The engines 22 and 23 may be of conventional axial flow type including a compressor section 24 for supplying air to the combustion chamber 25 where fuel is burned to produce gases which drive a turbine 26 and are discharged through the discharge nozzles 27 of the pods. The turbine 26 drives the compressor 24 in the usual way.

The trailing edges of the wings 18 and 19 are provided with movable flaps or ailerons 28 and 29 which are controlled as described hereinafter.

It will be understood that the aircraft is provided with suitable fuel tanks and the like for supplying fuel to the engines 22 and 23 and that the size and shape of the wings may be modified according to desired wing loading and performance characteristics.

The aircraft thus far described, with certain exceptions noted hereinafter, is largely conventional and is based on conventional practice. The new aircraft differs primarily from the conventional, however, in that it is provided with a rotary wing 30 of the single wing helicopter type, as shown in Figs. 1, 2 and 5. The wing 30 is of symmetrical or airfoil cross section. As illustrated, it may have a generally flat undersurface and a convexly curved upper surface in cross section so as to provide lift when it is rotated about its center of rotation C, Figs. 1 and 2. However, the undersurface of the wing 30 may be slightly convex or concave depending on lift requirements. One end 30a of the wing is shorter than the opposite end 30b and while serving to provide some lift during rotation is principally present to serve as a counterbalance and also to form with the section 30b an airfoil contour lengthwise of the wing. Thus, the upper surface 30c of the wing 30 is curved convexly upward from the end of the section 30a to the outer end of the section 30b to form, in effect, a lifting wing when moved endwise, as shown in the dotted line position in Fig. 2. The wing 30, therefore, when held endwise in the direction of travel of the plane, provides lift. The lift is sufficient to compensate for the added weight of the wing 30 and its supports, thereby reducing the loading on the wings 18 and 19.

The contour of the undersurface of the wing 30 and the shape of the top surface 12 of the fuselage are substantially complemental so that the wing 30 can be retracted flush against the surface 12 at the top of the plane to render the upper surface of the fuselage 10 streamlined in shape.

The rotary wing 30 is mounted in such a manner that it can be projected to a position above the fuselage or drawn downwardly against the upper surface of the fuselage, as described above. The mechanism for projecting and retracting the wing 30 is best shown in Figs. 5, 6 and 7. As shown in Fig. 5, the wing 30 is connected by means of a pivot 31 and a right-angularly related pivot 32 to a bracket 33 mounted on the upper end of a sleeve 34 to permit limited universal movement of the wing relative to the bracket 33. The sleeve 34 is mounted for rotation on a shaft 35 by means of the antifriction bearings 36 and 37. The wing 30, therefore, can rotate relative to the shaft 35 and it can pivot universally relative to the shaft 35 to a limited extent in the manner of all articulated helicopter or autogyro wings.

The shaft 35 is movable between the full line projected position shown in Fig. 5 and the dotted line retracted position shown therein in the following manner. The shaft 35 has a collar 40 fixed to it near its upper end, the collar 40 being hingedly connected to the apex of a V-shaped strut 41 (Fig. 6) which is pivotally connected to the fuselage at its outer ends 42 and 43. The lower end of the shaft 35 also has a collar 44 fixed to it which is connected by means of a hinge or pivot 45 to the apex of another V-shaped strut 46 (Fig. 7) which is pivotally connected at its outer ends 47, 48 to the fuselage of the aircraft. The relation of the struts 41 and 46 is such that they swing around their pivoted ends 42, 43 and 47, 48, respectively, so that the shaft 35 can swing from an almost vertical erected position to a slightly inclined or canted retracted position, as shown in dotted lines. Retraction and projection of the shaft 35 is accomplished by means of a hydraulic jack 50 having the lower end of its cylinder pivotally connected to a bracket 51 in the fuselage 10 and the upper end of its piston rod connected to the strut 46 by means of a pivot connection 52. The shaft 35 is further retained in its erected position by means of a collapsible toggle member 53 pivotally connected at its opposite ends to the collar 40 and the pivot connection 47, 48 and having a centrally located hinge 54 therein to enable it to collapse during retraction of the wing 30. Assisting the toggle member 53 in its collapsing movement is another hinged toggle 55 which extends between the toggle 53 and the V-strut 46 to the right of the hinge 54 and the pivot 45, respectively. The toggle 55 cannot straighten out completely and it prevents the toggle 53 from straightening out and locking or going beyond a straight position. Consequently, both of the toggles 53 and 55 collapse when the jack 50 pulls the strut 46 downwardly, as shown in dotted lines in Figure 5. The above-described projecting and retracting mechanism tilts the shaft 35 so that it can be stowed in a fuselage of shallower depth than the length of the shaft 35 while moving it to an almost erect position when it is fully projected.

The projecting and retracting mechanism described above is related particularly to the controls for the aircraft and has been constructed and arranged to accommodate these controls and to allow the use of a single set of controls for operating the aircraft either with the rotary wing or with the ailerons, rudder and elevator for fixed wing flght.

All of the control for the wing and elevator surfaces is accomplished by means of the two control levers or sticks 55 and 56. The function and operation of the stick 55 will first be described. As shown in Figs. 5, 8, 9 and 11, the stick 55 is mounted on the end of a torque rod 57 by means of a pivotal connection therewith to enable the lever to be rocked sidewise in either direction to rotate the torque rod 57 or forward and back to move therewith a link 58 which is connected to the lower end of the lever by means of a universal joint 59. The rear end of the link 58 is connected to a lever 60 pivotally mounted at about its middle on a pivot support 60a and having its upper end connected by means of the link 61 to the elevator horn 62 by means of which the elevator flap is rocked. Forward and backward movement of the lever or stick 55 thus will move the elevator to give longitudinal control of the aircraft when it is flying as a fixed wing aircraft. The stick 55 also controls the pitch of the rotary wing 30 for longitudinal control in the following manner. The link 58 is connected to the lower end of a generally T-shaped lever 63 pivotally mounted at 64 in the aircraft. The lateral arms of the T-shaped lever 63 are connected by means of spring and oil buffer links 65 and 66 and a center relatively movable lever 66a to the right-hand end of a link 67. The link 67 is connected at its inner end to a lever 68 pivotally connected at its lower end to a sleeve or collar 69 which is slidable lengthwise on the shaft 35. The link 67 and the lever 68 are connected also to a link or push rod 70 which has its upper end connected by means of a universal joint 71 to the control horn 72 that is fixed to the non-rotatable inner plate of the wobble or swash plate 73 by means of which the pitch of the rotary wing is controlled. The wobble or swash plate construction is conventional and includes a non-rotatable inner plate mounted for universal rocking movement on the shaft 35 and an outer ring 74 rotatable on the plate. The ring 74 is connected by means of a link 75 to the wing 30 at a point spaced from the axial pivot 32 of the wing support. By varying the fore and aft angle of the swash plate 73, the pitch of the wing 30 as it rotates around its center of rotation will be varied in the usual way. To assure rotation of the outer ring 74, it may be connected by means of a toggle 76 to the hub or sleeve 34. The connections described above enable the fore-and-aft movement of the stick to control the fore-and-aft tilt of the swash plate 70 as follows: As indicated in Figure 8, forward movement of the upper end of the control stick 55 will cause a counter-clockwise rotation of the link 66a about the pivot point 64. Such counter-clockwise movement of the lever 66a will cause an endwise movement of the link 67 to the left thereby straightening the toggle formed by the lever 68 and the link 70. Inasmuch as the lower end of the lever 68 moves around a fixed pivot point on the collar 69, straightening of the toggle will cause an upward movement of the link 70 thereby tilting the swash plate in a counter-clockwise direction. Rearward movement of the stick 55 will cause the toggle formed by the lever 68 and the link 70 to collapse in proportion to the movement of the stick 55 with resultant tilting of the swash plate assembly in a clockwise direction as viewed in Figure 8. It should be observed that the pivotal connection between the lever 68 and the links 67 and 70 is essentially in alignment with the pivotal connection 45 between the V-strut 46 and the shaft 35. Accordingly, movement of the rotary wing between its projected and retracted positions will not alter the relation mentioned above so that the linkage does not bind at any time and prevent movement of the stick 55. However, the angle between the link 67 and the spring-oil links 65 and 66 will change so that a very small endwise movement of the link 67 is produced by a large angular movement of the lever 63 when the wing 30 is retracted. Moreover, the oil-spring struts 65 and 66 provide some play to absorb shock and to permit movement of the stick 55 and operation of the elevator 14 when the wing 30 is retracted even if the swash plate and the wing 30 are so related that movement of the swash plate is not possible.

Figure 9:
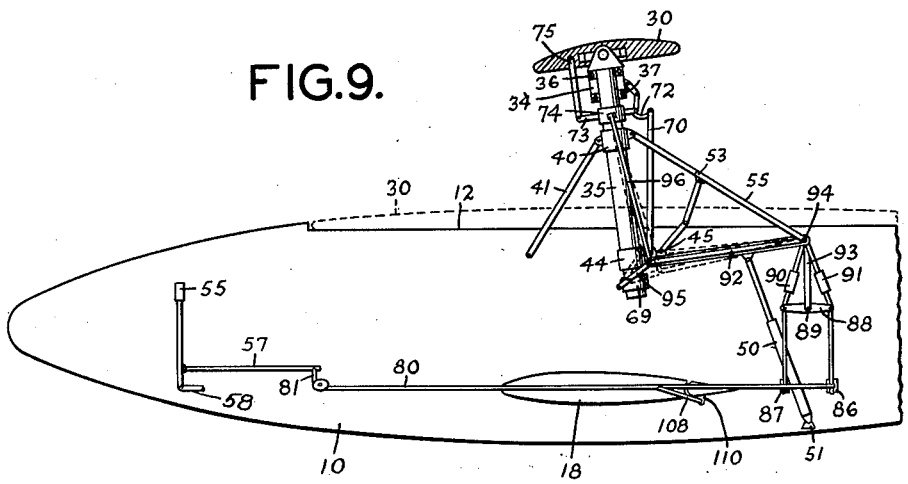
Fig. 9 is a view of the controls for lateral control of the aircraft for both rotary wing and fixed wing flight.
Figure 10:
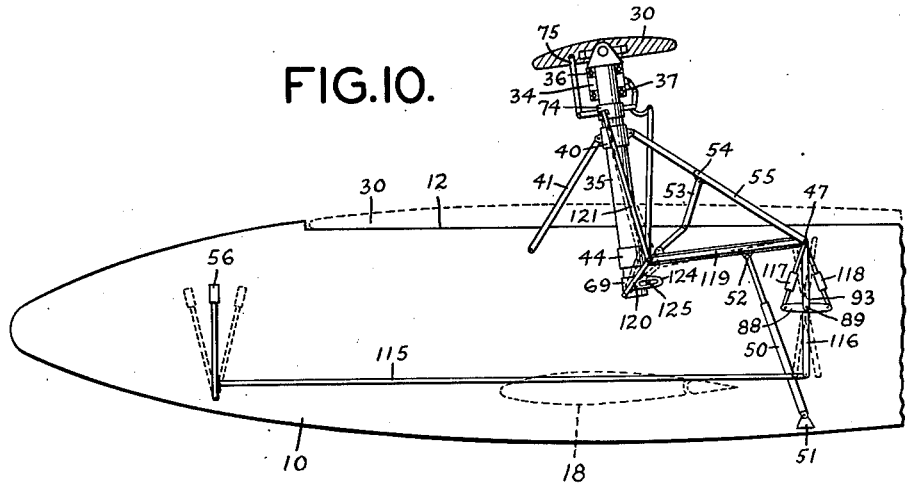
Fig. 10 is a view of the controls for regulating the collective pitch of the rotary wing for climbing and landing.

Lateral movement of the stick 55 is used to provide transverse control of the aircraft. Thus, as shown in Figs. 4, 5 and 9, the torque rod 57 is connected to a control cable 80 by means of a downwardly extending lever 81 so that rocking movement of the torque rod 57 causes lengthwise movement of the cable 80. The cable 80 extends around a pair of pulleys 82 and 83 on opposite sides of the fuselage and then back toward the rear of the fuselage and around the pulleys 84 and 85. The ends converge inwardly and pass beneath the pulleys 86 and 87 and are connected to the opposite ends of the rocker arm 88 shown in Fig. 9. The rocker arm is supported on a horizontal central pivot 89 mounted in the fuselage of the plane. The opposite ends of the rocker arm 88 are connected by oil-spring struts 90 and 91 to the end of a link 92. An upwardly extending movable link 93 is also connected between the pivot 89 and the pivot connection 94 between the link 92 and the struts 90 and 91. The inner end of the link 92 is connected to a lever 95 which is pivotally mounted on the sleeve 69 and has its outer end connected to the link or push rod 96 which is connected to the non-rotatable inner plate of the swash plate 73 so that rocking movement of the rocker arm 88 will collapse or straighten the toggle formed by the lever 95 and the push rod 96 to move the push rod 96 up or down and thereby rock the swash plate around an axis extending longitudinally of the fuselage and at right angles to the axis about which the swash plate is rocked by the link 70 and the control horn 72. The rocking movement of the swash plate produced by the push rod 96 therefore affects the pitch of the blade travelling in forward and rearward directions to render them equal or unequal and thereby provide lateral control during flight with the rotary wing 30.

Movement of the control stick 55 also regulates the position of the ailerons 28 and 29. As shown in Fig. 4, the opposite flights of the cable 80 are provided with spliced on sections 100, 101, which pass around the pulleys 102, 103 and are connected on their other ends, respectively, to the rocker arms 104 and 105 which are pivotally supported at their mid-portions in the wings 18 and 19. The rocker arms 104, 105 have lever extensions 106, 107 which are connected by means of links 108, 109 to the control horns 110, 111 on the elevators. The rear ends of the rocker arms are connected by means of a transversely extending cable 12 so that the rocker arms move in unison and thereby cause opposite tilting movement of the ailerons to afford the desired lateral control.

Collective pitch control for the rotary wing 30 for use during landing and take-off is controlled by the stick 56. The stick 56 is pivoted to the fuselage at its lower end and is connected by means of a link 115 to the lower end of a pivotally supported T-lever 116. The arms of the T-lever 116 are connected by oil-spring struts 117 and 118 to another link 119 having its inner end connected to a lever 120 pivotally mounted on the lower end of the shaft 35 and to the push rod 121 which is connected to the inner non-rotatable plate of the swash plate assembly 73. The lever 120 and push rod 121 form a toggle which is collapsed or straightened by endwise movement of the link 92 so that the entire swash plate assembly 73, 74, 75 is moved axially along the shaft 35 by movement of the stick 56. In this way, the swash plate can be shifted bodily relative the wing 30 to increase or decrease its pitch uniformly throughout its entire circle of rotation.

The lever 120 is provided with a slotted extension 124 which engages a pin 125 on the sleeve 69 so that rocking movement of the lever 120 will move the sleeve 69 up and down the shaft 35. Inasmuch as the levers 68 and 95 are carried by the sleeve 69, up and down movement of the sleeve will not change the adjusted positions of the swash plate for lateral and longitudinal control and adjustment of the collective pitch of the wing, therefore, will not appreciably alter the adjustment of the blade for lateral or longitudinal control. Any slight variations in pitch will be compensated in any event by the pilot by making the adjustment of collective, lateral and longitudinal pitch controls.

Control of the rudder 15 of the aircraft can be accomplished either by foot pedals or with a steering wheel mounted on one of the sticks 55, 56. The operation of this portion of the control mechanism is largely conventional.

The manner in which the rotary wing 30 is driven will now be described. Preferably the rotary wing is jet propelled and this can be accomplished in a number of different ways. As shown in Fig. 1, air can be taken off from the compressors 24 of the turbojet engines 22 and 23 by means of the conduits 130, 131 and fed through a flexible connection 132 and a suitable coupling through the interior of the hollow shaft 35 and into a duct extending lengthwise of the wing section 30b. The outer end of the wing section 30b has an enlarged portion 133 thereon which houses the combustion chamber for a jet engine. The air supplied from the turbo-jet engines 22 and 23 is fed to the combustion chamber to support combustion of fuel therein for discharge out of the nozzle at the wing tip 133 to cause rotation of the wing in a counterclockwise direction, as viewed in Fig. 1. Fuel can be supplied to the combustion chamber in the wing tip 133 from a tank in the fuselage or, if desired, small fuel tanks T, T', can be mounted in the wing 30 itself on opposite sides of the center of rotation to maintain the wing in balance. Inasmuch as the wing 30 is used primarily to enable the aircraft to take off and to land, the fuel supply required for the jet engine thereon is relatively small.

Many alternative constructions can be used for causing the wing to rotate, for example, rocket-type fuel may be used, if desired, or solid fuels or, for that matter a pair of jet-assist units which are completely self-contained and one of which may be used for take-off while the other is brought into play for landing.

Inasmuch as the wing is self-rotating, there is lower reaction torque tending to rotate the aircraft as a whole about the center of rotation C and any tendency that may occur can to a large degree be offset by the rudder 15 and by varying the thrusts of the engines 22 and 23.

It will be apparent from the preceding description that an aircraft has been provided in which the wing 30 can be projected and can be set into high speed rotation by means of a jet or similar unit contained therein to provide sufficient lifting force to enable the plane to take off at a speed far below that required to sustain it in flight with the fixed wings 18 and 19. After the plane has gained altitude, it may be brought up to fixed wing flying speed by jet engines 22, 23, at which time the operation of the rotary wing can be discontinued so that it merely autogyrates and provides lifting force at an intermediate range of speed, for example, in a range of 90 to 130 miles per hour. At higher speeds, the rotary wing 30 is brought to a stop by suitable braking means and because of its design, it will normally tend to assume a position lengthwise of the aircraft fuselage as shown in Fig. 1. The braking means may include brake shoes mounted on the shaft 35 and engaging the interior of the hub 34. When the wing has attained a position extending lengthwise of the fulselage, it is retracted on top of the fuselage to form a fuselage top of suitable aerodynamic properties capable of adding lift to the aircraft. Inasmuch as all non-streamlined parts for supporting and controlling the wing 30 are out of the air stream, the aircraft can be driven at very high velocities due to its low drag.

During landing, the speed of the plane is gradually decreased to a point where the rotary wing 30 can be extended. It is then set into rotation by the engine therein to provide lifting force to sustain the plane when the engines 22 and 23 are shut down to idling speed or are completely stopped. Control of the plane is then taken over through the medium of the rotary wing 30 and it can be maneuvered to bring the aircraft in slowly to a safe landing.

In addition to the greatly increased speed range produced with the aircraft embodying the present invention, the range of the aircraft can be increased due to the fact that less fuel is required on take-off due to the decreased distances required for landing and take-off. Moreover, safer operation of the aircraft is possible even if the engines 22 and 23 fail because it is possible to land the plane by autogyration or power operation of the rotary wing 30.

It will be understood that the above-described aircraft is typical of those contemplated by the present invention but that it may be varied in size, performance characteristics and structural details without departing from the invention.

Accordingly, the form of aircraft described herein should be considered as illustrative and not as limiting the scope of the following claims.

I claim:

1. An aircraft comprising a fuselage, a shaft mounted in said fuselage for movement between a first position extending upwardly through the top of said fuselage and a second position in which the shaft is retracted substantially completely within said fuselage, struts pivotally connected to said shaft adjacent opposite ends thereof and to said fuselage and supporting said shaft for movement between its first and second positions, a jack for moving said shaft between its first and second positions, a wing mounted on the upper end of said shaft for rotation and for limited universal pivoting movement relative to said shaft to enable the pitch of said wing to be changed, means for regulating the pitch of said wing, fixed wings on said fuselage, movable control surfaces carried by said fuselage; and means at all times connecting said control surfaces to and actuating them by the means for regulating the pitch of the rotary wing, said actuating means being operable in both the extended and retracted positions of said shaft.

2. The aircraft set forth in claim 1 in which the means for regulating the pitch of said rotary wing comprises link and leverage systems, each having pivotal connections substantially coaxial with the pivoted ends of one of said struts to enable said pitch to be regulated in both of said positions of said shaft.

3. An aircraft comprising a fuselage having closed top, side and bottom portions, fixed wings extending from said fuselage, control surfaces on said fuselage, reaction propulsion means therefor, a rotary wing, a support for said rotary wing mounted on said fuselage for movement between a retracted position in which the rotary wing extends lengthwise of said fuselage and rests against the closed top of said fuselage and an extended position in which said wing is spaced from the fuselage a distance sufficient to enable it to rotate relative to the fuselage, reaction propulsion means on said wing for rotating it, said rotary wing being a single-blade wing having its center of rotation near one end of said wing, said wing having a convexly curved upper surface of transverse and longitudinal airfoil contour to provide lift by rotation in an extended position and to provide improved aerodynamic characteristics upon endwise movement in a retracted position.

References Cited in the file of this patent

UNITED STATES PATENTS

| | | |
|---|---|---|
| 2,008,843 | Smith | July 23, 1935 |
| 2,330,803 | Andrews | Oct. 5, 1943 |
| 2,464,285 | Andrews | Mar. 15, 1949 |
| 2,498,283 | Lee | Feb. 21, 1950 |
| 2,531,976 | Garrett | Nov. 28, 1950 |
| 2,650,666 | Dorand et al. | Sept. 1, 1953 |